No. 898,377. PATENTED SEPT. 8, 1908.
J. H. KARNS.
COMBINED STOP AND CHECK.
APPLICATION FILED AUG. 23, 1906.
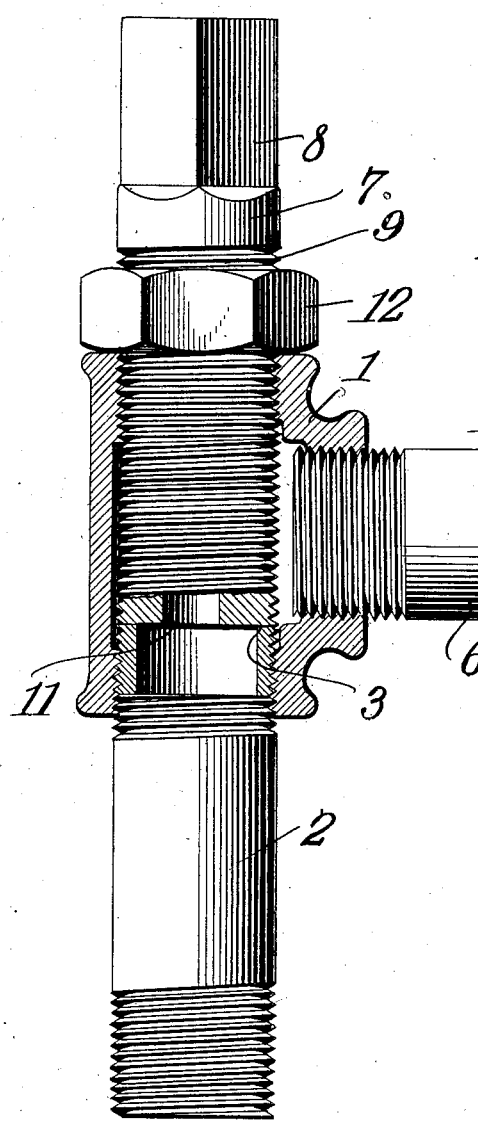
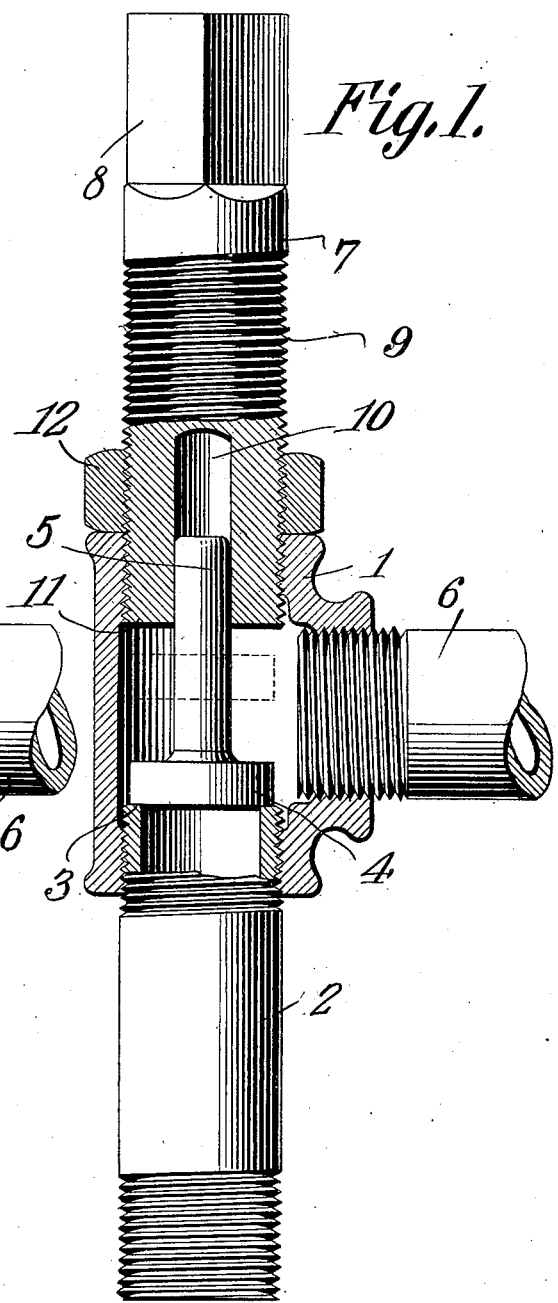
WITNESSES:
John H. Karns,
INVENTOR.
ATTORNEYS.

UNITED STATES PATENT OFFICE.

JOHN HENRY KARNS, OF WARREN, INDIANA.

COMBINED STOP AND CHECK.

No. 898,377.  Specification of Letters Patent.  Patented Sept. 8, 1908.

Application filed August 23, 1906. Serial No. 331,792.

*To all whom it may concern:*

Be it known that I, JOHN HENRY KARNS, a citizen of the United States, residing at Warren, in the county of Huntington and State of Indiana, have invented a new and useful Combined Stop and Check, of which the following is a specification.

This invention relates to combined stop and check valves.

The objects of the invention are to improve and simplify the construction of such devices; furthermore, to decrease the expense attending their manufacture and to increase their efficiency in operation.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of the following claims without departing from the spirit of the invention or sacrificing any of its advantages.

In the accompanying drawings forming part of this specification:—Figure 1 is a vertical section, partly in elevation, of a device constructed in accordance with the present invention; and Fig. 2 is a similar view showing the valve removed and the plug screwed down to act as a stop.

Like reference numerals indicate corresponding parts in the different figures of the drawings.

The improved stop and check valve of the present invention is provided with a T section 1 which constitutes the body portion of the device. Removably fitted into the body portion 1 is an inlet member 2 which preferably is in the nature of a pipe section screwed into the body portion 1, as shown. The upper end 3 of the inlet member 2 is suitably ground so as to serve as a valve seat.

Extending downward into the upper end of the body portion 1 in line with the inlet member 2 is a screw valve 7 having an angular head 8 at its outer end while its inner end is suitably ground as at 11 and designed to bear against the seat 3 so as to cut off communication between the pipe 2 and an outlet pipe 6 which is screwed into the body. Head 8 is designed to be engaged by a suitable wrench and a jam nut 12 may be mounted upon the threads 9 of the outwardly projecting portion of the valve for the purpose of locking said valve in closed position.

A socket 10 is formed longitudinally within the lower portion of the valve and is designed to loosely receive a stem 5 projecting from an auxiliary check valve 4 designed to be used in lieu of or in connection with the valve 7 as indicated in Fig. 1. This check valve normally rests by gravity on the seat 3 and the stem 5 thereof is of greater length than the socket 10 so that if it is desired to hold the check valve upon its seat the valve 7 can be screwed inwardly until the inner end of the socket is brought against the end of the stem whereupon the valve will be securely held. Also by adjusting the valve 7 inwardly or outwardly the movement of the check valve may be limited, said movement being equal to the distance between the stem 5 and the inner end of the socket 10.

It will be seen that the herein described valve can be readily converted from a screw valve to a check valve simply by removing valve 7 and placing the auxiliary valve 4 upon the seat 3 whereupon the screw valve can be replaced in body 1 so that stem 5 will project into the socket or recess 10. By manipulating this screw valve the movement of the check valve can be partly or entirely stopped so as to positively regulate the flow of liquid from pipe 2 to pipe 6. As the stem 5 is longer than the socket 10 there is no danger of the valve 4 coming into contact with the ground end 11 of valve 7 and scratching or otherwise marring it and rendering said valve 7 unfit for subsequent use without valve 4. Importance is attached to the fact that the member 2 constitutes the seat for the two valves and is constructed of an ordinary piece of pipe of uniform diameter and which can be readily placed in or removed from position.

What is claimed is:

In a valve the combination with a T-shaped body portion having alining threaded openings and an intermediate outlet opening; of a pipe section screwed into one of the alining openings and constituting a valve seat, a check valve loosely mounted and held by gravity upon the seat, said valve having a central stem perpendicular thereto, a screw valve mounted within the other alining opening of the body and having a longitudinal axial socket for the reception of the stem, said stem being of greater length than the socket and constituting means for holding its valve out of contact with the end of the screw valve, the end wall of said socket being disposed to bear against the stem to bind the check valve upon its seat, both of said valves being disposed to separately contact with the valve seat to close communication through the body.

In testimony that I claim the foregoing as my own, I have hereto affixed my signature in the presence of two witnesses.

JOHN HENRY KARNS.

Witnesses:
LEWIS TILGHMAN LONG,
ARTHUR MOSTLER.